March 19, 1957     B. BERKMAN     2,785,675
EAR PROTECTING DEVICES
Filed April 14, 1951     3 Sheets-Sheet 1
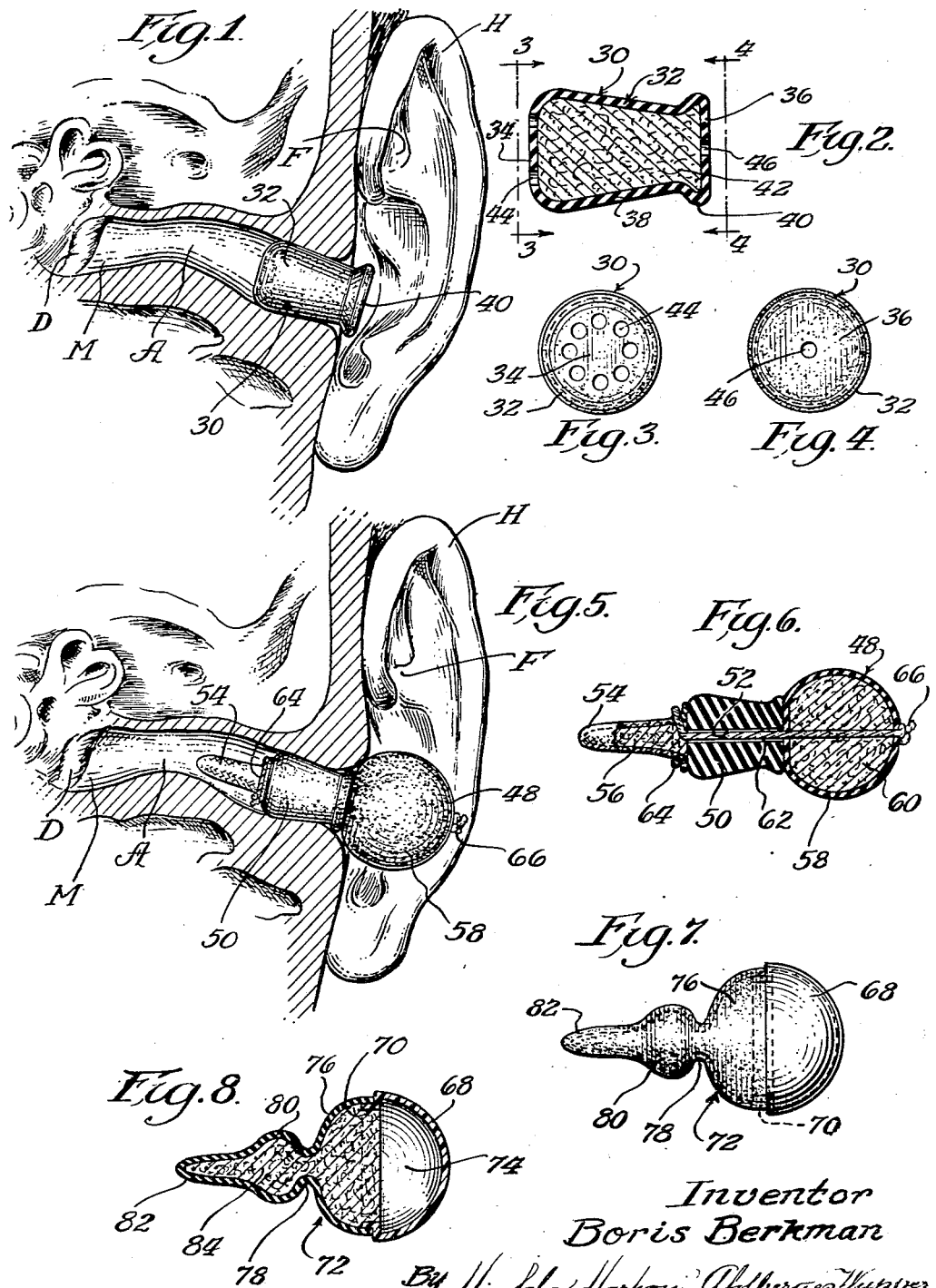
Inventor
Boris Berkman

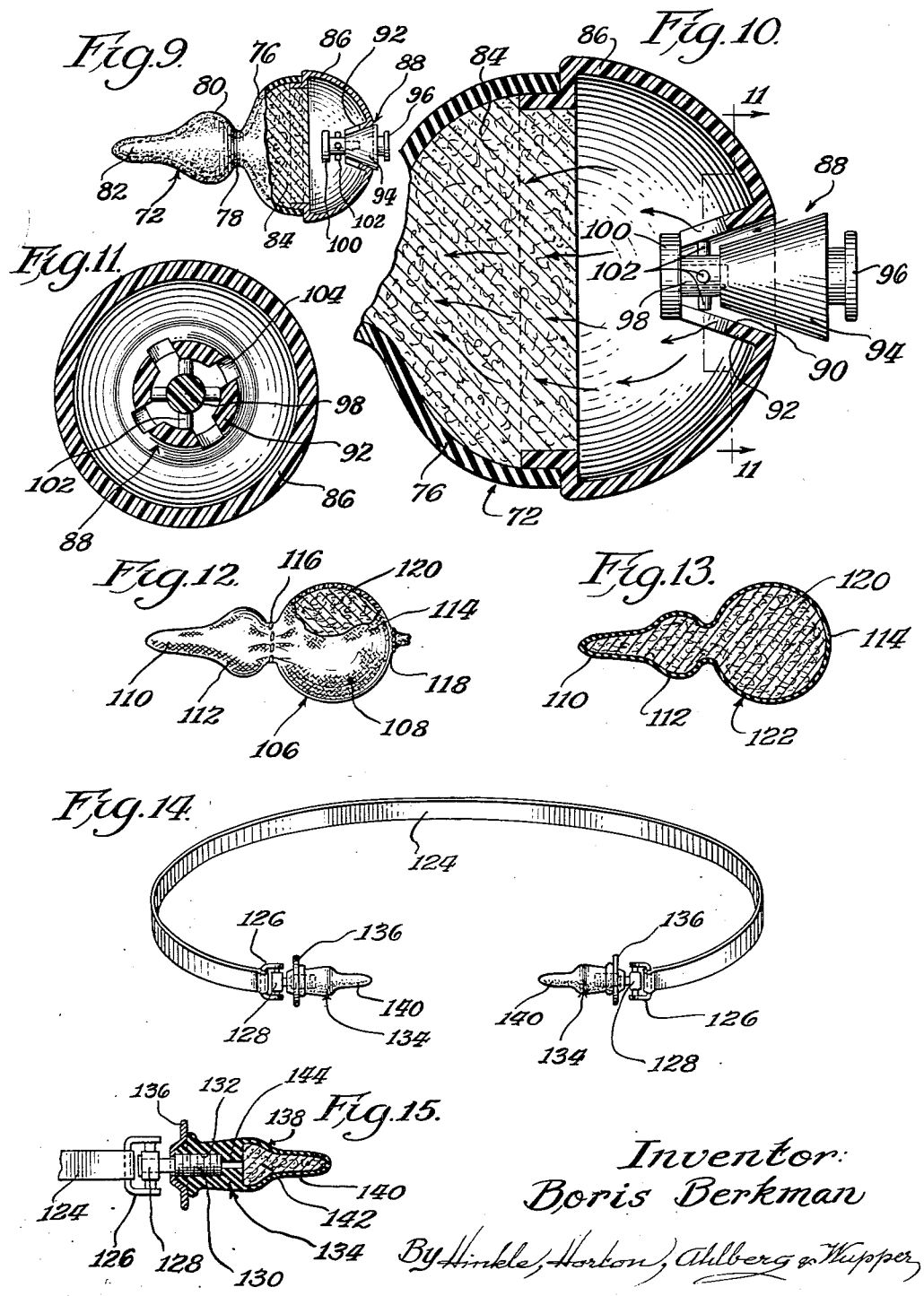

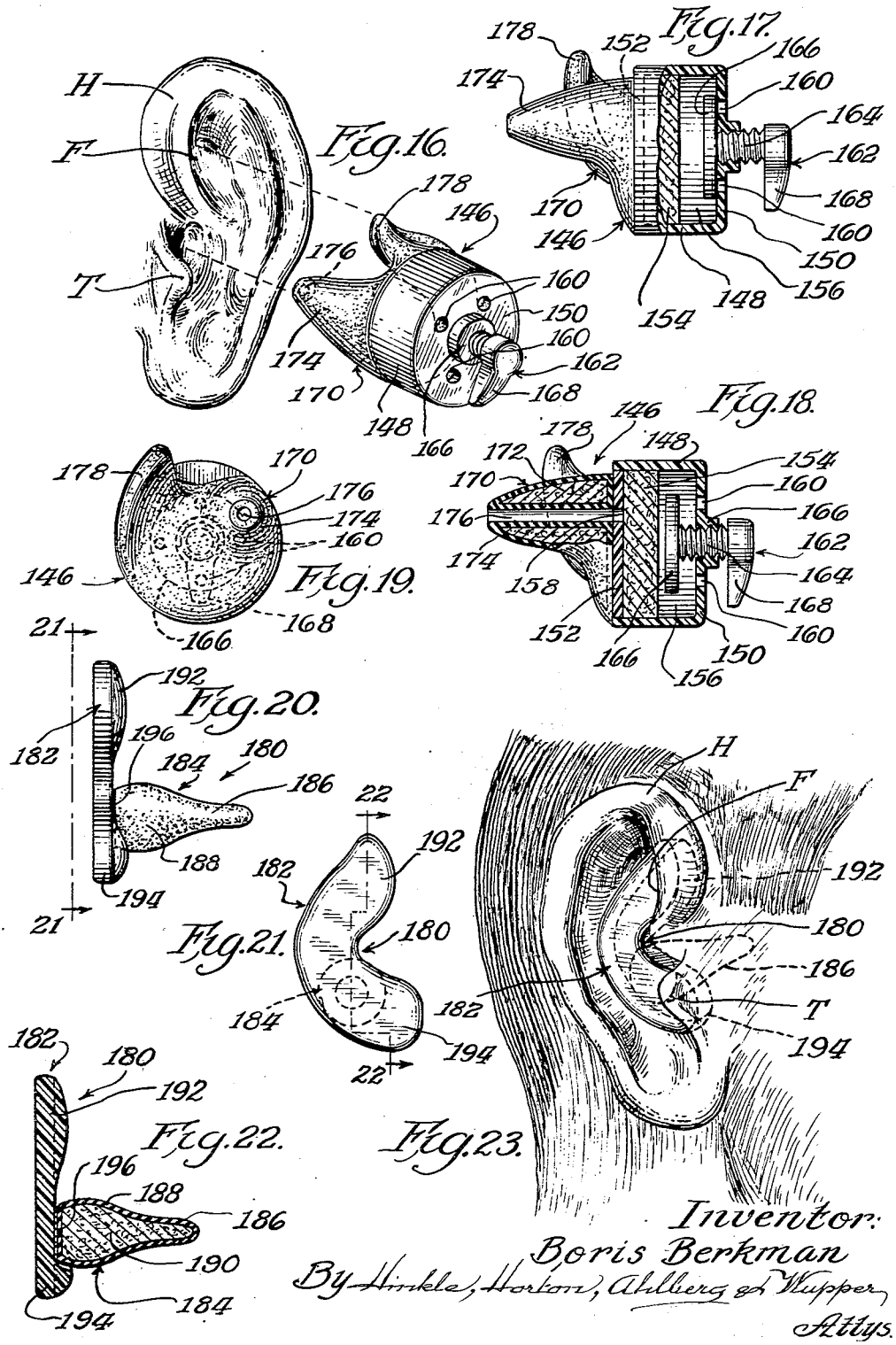

United States Patent Office 2,785,675
                                    Patented Mar. 19, 1957

2,785,675

EAR PROTECTING DEVICES

Boris Berkman, Chicago, Ill.

Application April 14, 1951, Serial No. 221,077

8 Claims.  (Cl. 128—152)

The present invention relates to an ear protecting device and, in particular, to a novel device for protecting the ear drum and other ear parts against pain or injury caused by changes in barometric pressure, noise, concussion, shock, water and the like.

The human ear drum is located in the middle ear and responds to fluctuations in air pressure and sound waves through the auditory canal. The middle ear is connected by the Eustachian tube to the oral cavity so that the pressure on the opposite sides of the drum head will be equalized to prevent pain and injury to the drum head. The Eustachian tube is a normally closed slit which opens in the act of swallowing or yawning from the action of the muscles lifting the palate. This tube is readily subject to inflammations arising from colds, sinusitis and other disorders of the oral and nasal passages. As a consequence, during these times of inflammation its function is impaired and extreme variations in barometric pressures, loud noises and concussions will be more sharply felt at the ear drum, sometimes with severe pain and injury.

Even a perfectly healthy person is liable to injury of his ear drums from sharp explosions and the like, and it is not unusual for military personnel to suffer punctured ear drums as a result of artillery fire and explosions. It is quite customary for these men to have impaired hearing for a short time after coming out of an area wherein there has been a large amount of gunfire, explosions and the like, such as a battle area or the artillery and rifle ranges.

It is the principal object of the present invention to provide a device for preventing pain and injury to the ear, particularly the drum head, arising from changes in barometric pressures at opposite sides of the drum head, noises, concussions, shocks, water and the like.

It is another object to provide a novel device which may be held at the outer end of the auditory canal of the ear in perfect comfort and which will effectively deaden any sounds from reaching the drum head with sufficient intensity to cause pain or injury.

A further object is to provide a novel device for preventing sounds, noises and wide rapid changes in barometric pressures from reaching the ear drum with sufficient intensity to cause pain or injury which device includes as a major constituent a quantity of fine cellular material held in sound blocking position relative to the auditory canal.

Another object is to provide a novel device having the above characteristics which incorporates milkweed floss as the cellular material.

And a further object is to provide a novel ear protecting device which incorporates as a sound insulating material milkweed floss fiber which is not subject to mold or other deterioration and which does not support the growth of bacteria which could irritate and inflame the ear drum or ear passages.

A still further object is to provide such a device which may be manually manipulated so that in one position it will completely block any sound waves or the like from reaching the ear drum and in another position will permit their reaching the ear drum in such low intensity as to prevent pain or injury but yet of sufficiently high intensity so that the ear drum will respond in such manner that conversation will be intelligent.

Another object is to provide such a device which may be inserted in the outer end of the auditory canal by the user without fear of injury to any part of the ear.

A further object is to provide such a device which is relatively inconspicuous and which will be effective to carry out the other objects.

Still another object is to provide a device attaining all of the foregoing objectives which is economical to manufacture and readily packaged.

Further objects and advantages will become apparent from the following description taken in conjunction with the accompanying drawings wherein:

Fig. 1 is an elevational view of a first form of ear protecting device showing it inserted in sound blocking position in the outer end of the auditory canal;

Fig. 2 is a longitudinal sectional view of the device illustrated in Fig. 1;

Fig. 3 is an inner end elevational view and may be considered as taken substantially along the line 3—3 of Fig. 2;

Fig. 4 is an outer end elevational view and may be considered as taken substantially along the line 4—4 of Fig. 2;

Fig. 5 is an elevational view of a second form of ear protecting device shown in sound blocking position at the outer end of the auditory canal;

Fig. 6 is a longitudinal sectional view of the device of Fig. 5;

Fig. 7 is an elevational view of a third form of ear protecting device particularly adapted for use by military personnel;

Fig. 8 is a longitudinal sectional view of the device shown in Fig. 7;

Fig. 9 is a view, partly broken into section, of a fourth form of ear protecting device;

Fig. 10 is an enlarged longitudinal sectional view illustrating in detail the valve mechanism of the fourth form of ear protecting device;

Fig. 11 is an enlarged transverse sectional view taken substantially along the line 11—11 of Fig. 10;

Fig. 12 is an elevational view, partly broken into section, of a fifth form of ear protecting device;

Fig. 13 is a longitudinal section illustrating a modification of the device shown in Fig. 12;

Fig. 14 is a perspective view of a still further form of ear protecting device particularly adapted for wear by passengers in an airplane and incorporating means for holding the device in place;

Fig. 15 is an enlarged elevational view of one of the ear inserts shown in Fig. 14;

Fig. 16 is a perspective view illustrating a further modification of the present invention and showing the manner in which it is to be held in place in the ear;

Fig. 17 is an elevational view, partly broken in section, of the device shown in Fig. 16;

Fig. 18 is a longitudinal sectional view of the device shown in Fig. 16 illustrating the control valve in open position;

Fig. 19 is an inner end elevational view of the device shown in Fig. 16;

Fig. 20 is an elevational view of still another form of ear protecting device;

Fig. 21 is an outer elevational view of the device shown in Fig. 20 and may be considered as taken substantially along the line 21—21 of Fig. 20;

Fig. 22 is a cross-sectional view of the device shown in Fig. 20 and may be considered as taken substantially along the line 22 of Fig. 21; and Fig. 23 is a perspective view illustrating in full and dotted lines the manner in which the device of Fig. 20 is retained in sound blocking position in the ear.

In some of the views in the drawing, portions of the ear have been illustrated and the following reference characters will be applied thereto:

M—middle ear
D—drum head or ear drum
A—auditory canal
H—helix
F—fossa of the antehelix
T—tragus The Eustachian tube is not shown in any of the views but in Figs. 1 and 2 and it would extend slightly downwardly to the left from the middle ear on the inner side of the drum head D.

Referring first to Figs. 1 to 4, the ear protecting device is indicated as a whole by the reference character 30 and comprises a casing 32 having an inner end wall 34 and an outer end wall 36 and a side wall 38 tapering slightly downwardly from the inner end toward the outer end so that a finger gripping rim 40 is provided adjacent the outer wall 36. The casing 32 is preferably formed of molded rubber material or latex which is resilient but will retain its shape in relaxed position. It is preferred that a resilient material as opposed to a hard rubber or plastic be used so that the casing will fit auditory canals of varying sizes and so that it will conform itself to the contours of the outer end of the canal and, except as herein noted, seal against any sounds and pressure variations reaching the ear drum. The casing 32 is hollow and has its interior completely filled with a cellular fibrous material 42 which is preferably milkweed floss.

It is preferred that milkweed floss be used as the sound insulating material because it has extremely high soundproofing or sound insulating characteristics. In fact, it is one of the three best of such materials known to man, the other two being kapok and glass fiber. Milkweed floss in its natural state is a very fine tube having a length ¾" to 1½" and when separated from the pod is closed at one end and open at the other, thereby forming a tiny dead air space or cell. Milkweed floss fibers are not readily subjected to mold or deterioration and furthermore does not retain moisture. It has been found that milkweed floss is highly resilient and may be compacted quite substantially and yet readily return to its original dimensions. Its sound deadening and soundproofing qualities in the environment in which they are used in this device rise from two aspects; the first, of course, is due to the fact that the floss fibers themselves are tubular and fine so that each tube in itself constitutes a dead air space, and secondly when a very large number of these fibers are brought together within a sack or casing such as the casing 32 they form minute pockets among them which trap sounds and fluctuations in air pressure. These characteristics of milkweed floss fibers are also found in kapok and glass fibers.

In order that the ear protecting device 30 not completely cut off all sound from reaching the ear drum, it may be provided with a plurality of small openings 44 on the inner wall 34 adjacent the outer edge thereof and a central opening 46 in the outer wall 36. It is to be noted that the openings 44 are positioned as far as possible from the opening 46 so that any sound desired to be transmitted through the device 30 must travel the longest distance through the device. In this way the maximum amount of soundproofing is obtained from the fibers 42 to sufficiently reduce the intensity of loud noises and the immediacy of wide changes in barometric pressures thereby preventing pain and injury to the drum head D. However, should it be desired to eliminate all sound from reaching the drum head the wearer merely need close the openings 46 by a light pressure of the fingers.

It will be seen, therefore, that the device 30 carries out all of the objectives stated at the outset of this specification. It is very readily inserted into the auditory canal A and is quite inconspicuous. If it is desired to make the device even more inconspicuous, it is obvious that the casing 32 may be given a flesh color tint.

In the second form of the invention shown in Figs. 5 and 6 a protecting device 48 is retained at the outer end of the auditory canal by a plug 50 having the same outer contours as the casing 32 and made of a resilient rubber, latex or similar material provided with an axial bore 52 through which desired sounds are permitted to reach the ear drum D. At the inner end of the bore 32 and effectively blocking it is a sack 54 made of a sterile gauze or similar material filled with milkweed or other cellular soundproofing fibers 56. At the outer end of the bore 52 is a somewhat spherical resilient molded rubber or latex casing 58 filled with milkweed floss or other soundproofing fiber 60. The sack 54 and casing 58 are retained in their respective positions closing the inner and outer ends of the bore 52 by a thread 62 looped and tied at 64 about the sack 54 and extending axially through the sack 58 to be tied at 66.

The ear protecting device 48 functions in substantially the same manner as does the device 30 except that the sacks 54 and 58 containing the soundproofing material, preferably milkweed floss fiber, act to deaden those sounds which are desired to be transmitted to the ear drum 10 in a lower intensity. This device may be made substantially soundproof by pressing the sack 58 to compress it against the outer end of the bore 52 and this will effectively prevent any sound from reaching the ear drum D.

The form of ear protecting device illustrated in Figs. 7 and 8 is particularly adapted for use by the military personnel and is comprised of two parts. The first and outer part is a hemispherical plastic shell 68—preferably methyl methacrylate plastic—having a flange 70 at its open side to which is attached in any suitable fashion such as by an adhesive (a rubber base or plastic adhesive) a sack 72. The shell 68 is hollow and provides a dead air space 74. The sack 72 has a large outer portion 76 generally hemispherical in shape and of somewhat smaller dimensions than the shell 68 connected by a neck 78 to a smaller ball-like portion 80 and terminates in a slightly tapering extension 82, the outer dimension of which is substantially the same as the internal dimension of the auditory canal A.

The sack 72 is formed of molded rubber or latex and tends to retain its shape. It is filled with sound deadening material 84, preferably milkweed floss fiber, which is compacted therein so as to increase its sound insulating characteristics. The device is inserted into the ear in the same fashion as the devices previously described and the ball-like portion 80 seals at the outer end of the auditory canal A to hold the device in proper position. This ear protecting device is particularly adapted for the military personnel because it has a dual soundproofing or deadening effect obtained by the combination of the dead air space 74 in the plastic shell 68 and the milkweed floss fiber 84 in the sack 72. A person wearing one of these will have no sound or concussion reach the ear drum in intensity sufficient to cause pain or injury thereto.

The device illustrated in Figs. 9 to 11 is the same as that shown in Figs. 7 and 8 except that the plastic hemispherical shell, indicated by the reference character 86, is provided with a manually operable valve 88. The valve 88 comprises an inwardly tapering valve seat 90 formed by a frusto-conical portion 92 on the inner side of the shell 86. The valve body is a complementary tapering plastic member 94 having a finger grip 96 formed at its outer end and a stem 98 on its inner end. A circular disc 100 having a diameter larger than the diameter of the inner end of the valve seat 90 is secured to the end of the stem 98 to limit the outward movement of the valve body 94.

In order that the valve body 94 be retained in its outer adjusted position the stem 98 is provided with a plurality of radially outwardly extending pins or projections 102 which are adapted to engage the conical wall of the valve seat 90 outwardly from the inner end thereof. Inasmuch as these pins or projections 102 extend farther outwardly than the inner diameter of the valve seat 90, the valve seat 90 is provided with complementarily disposed slots 104 extending outwardly from the inner end thereof to permit passage of the pins 102.

This device operates in exactly the same form as that shown in Figs. 7 and 8 when it is desired to cut off all sound from reaching the ear drum. Under these conditions it is merely necessary that the valve 88 be adjusted to its closed position (Fig. 9). When, however, the wearer wishes to hear sounds such as conversation carried on at close range, the valve body 94 is pulled outwardly by means of the finger grip 96 until the disc 100 contacts the inner end of the conical projection 92. The valve body 94 is then rotated slightly in either direction so that the projections or pins 102 bear against the conical valve seat 90 to retain the valve 94 in its open position (Fig. 10).

The ear protecting device 106 illustrated in Fig. 12 has substantially the same shape as that illustrated in Figs. 7 and 8 except that it comprises a sterile gauze sack 108 having an inner tapered portion 110 adapted to be inserted snugly into the auditory canal A, a bulbar portion 112 coacting with the outer end of the canal A to anchor the device 106 in place in the ear, and an outer somewhat larger bulbar portion 114 which may be manipulated by the fingers to increase or lessen the sound deadening effect of the device 106. A thread 116 necks down the sack between the bulbar portions 112 and 114, and a thread 118 ties the outer end of the sack 108 to prevent loss of any floss 120 contained therein.

The device shown in Fig. 13 is similar to that shown in Fig. 12 except that it is formed by a molded rubber or latex casing 122 to form the portions 110, 112 and 114.

These two devices operate in substantially the same way except that the device shown in Fig. 13, inasmuch as it has an impervious casing 122 rather than a pervious one more effectively deadens the sound. It is of course possible to combine the attributes of both of these, making that portion which extends into the auditory canal of sterile gauze while the larger bulbar portion may be made of a rubber or latex casing, both being filled with sound insulating material.

The apparatus illustrated in Fig. 16 is arranged to have a pair of ear plugs retained in position by a curved flat wire spring 124 having a yoke 126 pivotally secured to each end thereof. A T-shaped member 128 including a threaded shank 130 is pivotally mounted between the arms of the yoke 126. The threaded shank 130 is screwed into a bore 132 in a plug portion 134. A metallic or plastic flange 136 covers the outer end of the plug portion 134 and protects it against damage when the device is not in use. At its inner end the plug 134 is provided with a molded sack 138 having an extension 140 of a size snugly to fit the auditory canal A. The sack 138 is filled with milkweed floss fiber 132 for sound insulating purposes. The threaded bore 132 is connected to the interior of the sack 138 by a smaller bore 144 so that if desired the plug 134 can be unscrewed from the retaining wire clip 124 and used in the same manner as, for example, the ear protecting device 30.

Figs. 16 to 19 illustrate a further form of ear protecting device indicated generally by the reference character 146 which comprises an outer cylindrical shell 148 made of plastic material, such as methyl methacrylate or the like, having an outer plane wall 150 and an inner wall 152 secured to the cylindrical wall by a suitable plastic adhesive. The interior of the shell 148 is partially filled with a sound deadening material 154, preferably milkweed floss, and is provided with an air space 156. A single relatively large opening 158 is formed in the wall 152 and a plurality of somewhat smaller openings 160 concentrically arranged about the axis of the shell are formed in the wall 150 to prevent the transmission of sound at a lower intensity through the device.

The limited transmission of the sound through the device 146 is controlled by a valve structure 162 comprising a threaded stem 164 which is screwed into a threaded boss 166 located centrally of the small apertures 160 in the wall 152. A valve disc 166 is secured to the inner end of the threaded stem 164. The closed and open positions of the valve 162 are shown in Figs. 17 and 18, respectively. A tiny handle 168 is provided at the outer end of the threaded stem 164 for manipulating the valve disc between its two extreme positions.

The ear protecting device 146 is retained in position in the ear by a molded rubber or latex hollow part 170 which may be filled with milkweed floss fiber 172 and secured to the wall 152 by a suitable adhesive. The part 170 is formed with a first projection 174 arranged to extend into the auditory canal A, and this portion 174 has formed therethrough a bore 176 communicating with the opening 158 in the partition 152 for the purpose of transmitting sound at low intensity when desired. The casing 170 is also provided with a lip 178 which is adapted to engage within the fossa of the antehelix for the purpose of retaining the device 146 in proper position. The projection 174 which is arranged to extend into the auditory canal also fits this canal quite snugly so that it assists in retaining the device 146 in a position to deaden sound transmission. The functioning of this device is obvious in view of the description of the functioning of those devices previously described in this specification.

The ear protecting device shown in Fig. 20 is particularly adapted for protecting swimmers against the entry of water into the auditory canal and against the ear drum. This device is indicated as a whole by the reference character 180 and comprises two parts, namely a plastic plate-like retaining part 182 and a sack 184. The sack 184 has a tapered projection 186 adapted to extend snugly into the auditory canal A and the bulbar portion 188 to seal against the outer end of the auditory canal. The sack 184 is filled, of course, with milkweed floss fiber or the like 190 for purposes of sound-deadening and also to fill the sack and to insure that it acts resiliently against the auditory canal perfectly to seal it against the ingress of water.

The configuration of the part 182 which is generally flat is seen best in Figs. 20 and 21 wherein it appears to have a somewhat open C-shape with a portion 192 adapted to engage behind the fossa of the antehelix and a second portion 194 adapted to engage behind the tragus. The milkweed floss filled sack 184 is located closer to the lower end or end 194 of the retaining plate 182 rather than the upper end in order that it might accurately project into the auditory canal and the sack 184 is secured to the plate 182 by a suitable adhesive 196. While it has been indicated that this device 180 is particularly well adapted for protecting swimmers against water entering the outer ear, it also is useful in the same manner as the other devices for deadening sound and preventing damage to the ear drum from concussions and the like and severe changes in barometric pressures.

In the accompanying claims the terms sound insulating material and sound insulating fibers are intended to encompass all such fibers containing minute air spaces therein and which, therefore, act as the best sound insulators as contrasted with solid fibers, such as cotton or wool, which being solid conduct sound. Thus it is possible to use properly processed or ginned kapok fibers and glass fibers.

It will be apparent from the foregoing description that the various modifications of the invention which have been illustrated and described fully carry out all of the objectives claimed for this invention. It will, however, be obvious that further changes and modifications may be made and the scope of the protection is to be limited only by the appended claims.

What is claimed as new is:

1. An ear protecting device of the class described comprising in combination a quantity of milkweed floss fiber, and means for pliably confining said quantity of milkweed floss fiber so as to be held in place at the outer end of the auditory canal.

2. An ear protecting device of the class described comprising in combination a pliable sack, a quantity of milkweed floss fiber enclosed within said sack, and means cooperating with the outer end of the auditory canal for supporting said sack at least partially within the auditory canal.

3. An ear protecting device of the class described comprising in combination a pliable sack, a quantity of milkweed floss fiber enclosed within said sack, and means engageable with a part of the outer ear for supporting said sack in sound blocking position relative to the auditory canal.

4. An ear protecting device of the class described comprising in combination a sack, a quantity of milkweed floss fiber enclosed within said sack, shell means forming an enclosed dead air space and mounting said sack, and said sack being shaped to secure the device at the outer end of the auditory canal.

5. An ear protecting device as claimed in claim 4, including means forming a manually operable valve in said shell means for venting said air space and the device to sound.

6. An ear protecting device of the class described comprising in combination a resiliently deformable casing, a quantity of milkweed floss fiber enclosed within said casing, and openings formed in either end of said casing so as to permit in a limited manner sound travel therethrough.

7. An ear protecting device of the class described comprising in combination a resiliently deformable casing and a quantity of milkweed floss fiber enclosed within said casing.

8. An ear protecting device of the class described comprising in combination a casing, a quanity of milkweed floss fiber enclosed within said casing, and resilient means for holding said casing in sound blocking position at the outer end of the auditory canal.

References Cited in the file of this patent

UNITED STATES PATENTS

| 706,975 | MacBeth | Aug. 12, 1902 |
| 2,246,736 | Knudsen | June 24, 1941 |
| 2,437,490 | Watson | Mar. 9, 1948 |
| 2,441,866 | Cantor | May 18, 1948 |

FOREIGN PATENTS

| 977,197 | France | Nov. 8, 1950 |